UNITED STATES PATENT OFFICE.

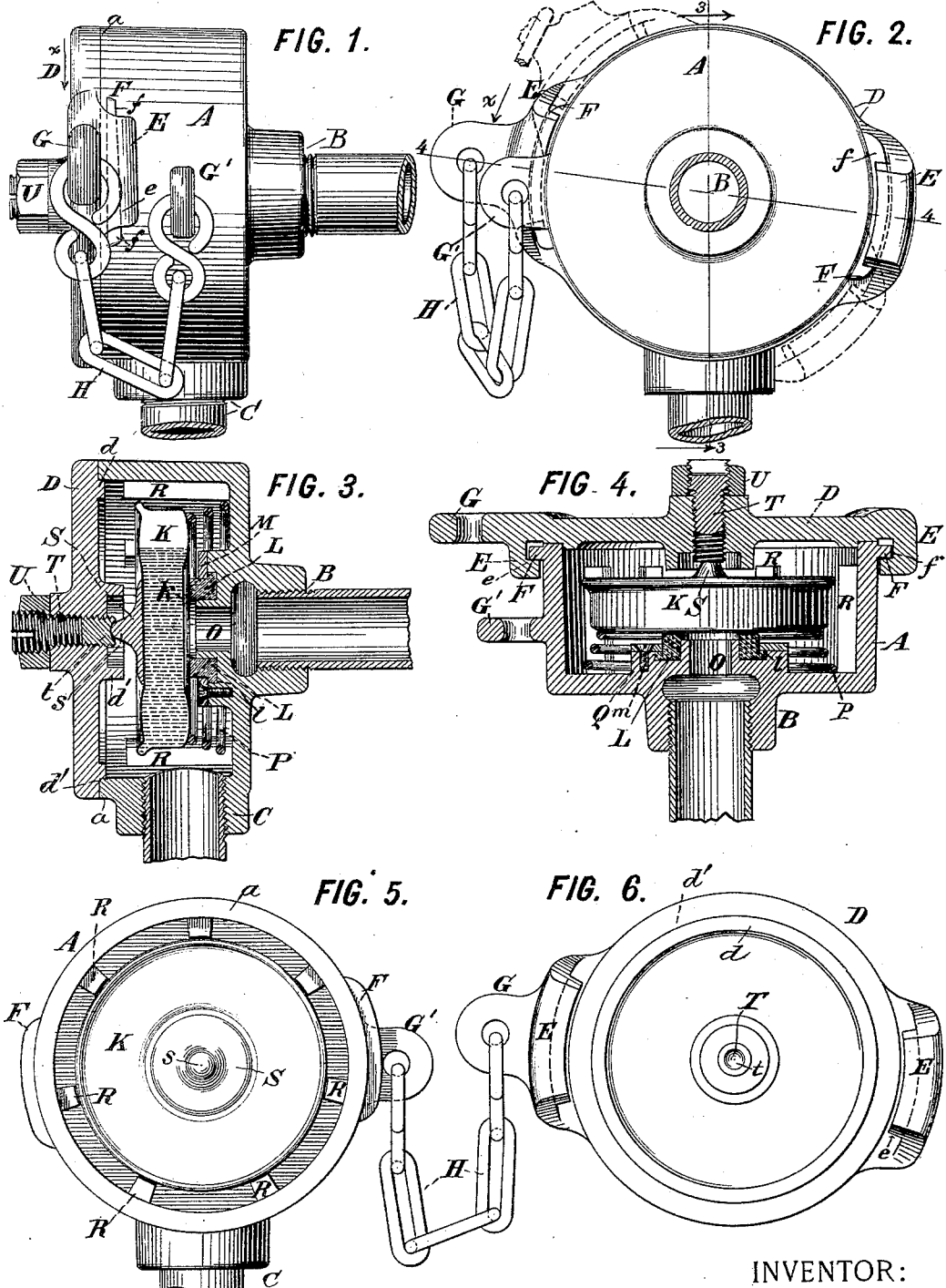

EDWARD E. GOLD, OF NEW YORK, N. Y.

STEAM-TRAP.

SPECIFICATION forming part of Letters Patent No. 424,779, dated April 1, 1890.

Application filed July 19, 1889. Serial No. 318,068. (No model.)

*To all whom it may concern:*

Be it known that I, EDWARD E. GOLD, a citizen of the United States, residing in New York city, in the county and State of New York, have invented certain new and useful Improvements in Steam-Traps, of which the following is a specification.

My invention relates to traps of the class known as "thermostatic steam-traps" for the removal of condense-water from steam-mains, and wherein the valve is a closed vessel of elastic metal containing a liquid which volatilizes at a temperature below that of the steam. The changes of temperature of the steam and condense-water in the mains with which the trap is connected cause expansions and contractions of the volatile liquid, whereby one of the faces of the valve-vessel is respectively forced upon and retracted from the valve-seat. A trap of this type is shown in my patent, No. 350,880, dated October 12, 1886. Such traps have the advantages of very positive motion of the valve and great simplicity of construction.

My present application pertains to certain improvements in this class of traps.

Referring to the accompanying drawings, Figure 1 is a side elevation of the steam-trap. Fig. 2 is a rear elevation in a plane perpendicular to the plane of Fig. 1. Fig. 3 is a vertical section through the center of the trap, cut on the line 3 3 in Fig. 2. Fig. 4 is a horizontal section on the line 4 4 of Fig. 2. Fig. 5 is a view of the interior of the trap, looking toward the right in Fig. 1. Fig. 6 is a view of the inner side of the cover.

A is the casing of the steam-trap, preferably formed of cast metal in cylindrical shape and having a threaded inlet-opening B for connection with the steam-inlet pipe, and also a threaded discharge-opening C at the lowest part of the trap for connection with a drip-pipe.

D is the cover, which is cast with diametrically-opposite hooks E, adapted to engage with diametrically-opposite lugs or wings F, which are cast upon the casing A. The wings F are shaped like frustums of wedges, having their inner faces $f$ inclined to the face $a$ of the casing A, as clearly shown by the dotted lines in Fig. 1, and the inner faces $e$ of the hooks E are similarly inclined. The degree of spread or opening of the jaws of the hooks E is such that when the cover D is turned home in the direction of the arrow $x$ in Figs. 1 and 2 the said cover will be drawn with great force upon the casing A.

$d$ is a rim on the inside of the cover D, to hold the same concentric to the case while it is turning.

To secure the cover upon the case, it is placed with the hooks E in the position indicated by the dotted lines in Fig. 2 and turned in the direction of the arrow. Then the jaws of the hooks E engage upon the wings F and the cover is forced upon the case. To secure a tight joint, the faces $a$ and $d$ of the casing and cover, respectively, are made true planes. To remove the cover, it is simply rotated in the opposite direction. On the cover is a chain-lug G, so placed that its weight, together with the weight of the chain H, tends to rotate the cover in the direction of securing it on the casing, and thus to prevent the displacement of the cover by the vibration of the trap when used on a railway-car. G' is a similar chain-lug on the casing. The use of the chain H is simply to attach the cover to the casing, so that it may not be lost.

In the casing A is loosely placed a valve K, which is a closed vessel of elastic metal, partly filled before it is sealed up with some liquid which volatilizes at a temperature below that of the steam. The front face of valve K is somewhat rounded circumferentially and depressed centrally, forming a circular plane surface $k$, which seats upon the valve-seat L. This valve-seat is placed, as shown, preferably in connection with the inlet B, and it is formed of a ring of elastic composition known as "Jenkins's valve-seat," or other elastic substance, held in place by a nipple or ring M, which bears upon a shoulder $l$ of the valve-seat L, and is fixed in the casing by screws $m$. Concentrically within the interior opening of the valve-seat L is a ring or nipple O, preferably cast integral with the casing A, and having its inner surface finished to a true plane. This nipple O projects into the casing A a less distance than the valve-seat L, but a greater distance than the ring M, whereby it is evident the wear of the valve-seat L will permit the valve K to seat upon the nipple O, thereby forming a tight seating, notwithstanding the wear of the seat L. The surface of the nipple O is preferably made of small area, whereby the pressure of the valve K upon the nipple O is concentrated and the tightness of the seating promoted.

Should a partial vacuum be formed in the mains by the shutting off and condensation of the steam while the valve K is closed, it is evident that the vapor in the valve K will tend to force the face $k$ of the said valve firmly upon the seat L. To prevent this, I employ a spring P, preferably helical, engaging upon the valve K to force the same away from the seat. This spring P may be secured in the casing A by its bottom coils engaging ribs R R, Fig. 4, cast upon the inner side of the casing A or in other suitable manner. The free end of the spring engages upon the rounded circumferential part of the valve K, as is indicated in Figs. 3 and 4, and the spring is arranged to be compressed when the valve K seats on the seat L. This bearing of the spring P on the rounded part of the valve K tends to cause the latter to take a position concentric to the valve-seat L and to hold it in a plane parallel thereto; but the said valve K is also prevented from any considerable departure from such concentricity by reason of the guide-ribs R R, which are cast on the inside of the casing A radially around the valve-seat L.

On the rear face of the valve K is brazed or otherwise fixedly secured a boss S, having a rounded extremity $s$, which seats in a concavity $t$ in a set-screw T, which threads in engagement with a threaded opening through the center of the cover D. The rounded extremity $s$ of the boss S is placed axially as respects the valve K, and with the concavity $t$ forms a rocking connection or back-stop to limit the degree to which the spring P can thrust the said valve away from the seat L. The outer part of the set-screw T is threaded, as shown, and slotted to facilitate setting it up to the required adjustment. After the set-screw T is adjusted a jam-nut U is screwed up on the external threads and fixes the set-screw in its adjusted position.

In putting the trap together the spring P is first inserted, and then the valve K is slipped in, being guided by the ribs R. The cover D is then placed on the casing A, taking care that the boss S seats in the concavity $t$ of the set-screw T. Then, by rotating the cover, as hereinbefore said, it is secured upon the casing A.

The trap operates as follows: Suppose steam to have been shut off and the valve K to be open. Steam is now turned on and blows against the valve K through the inlet B, thereby heating the volatile liquid in the valve, which expands and forces the face $k$ upon the valve-seat L. Steam is thus shut off from the trap, and when the latter cools the volatile liquid contracts and the spring P forces the valve K from the seat L against any partial vacuum which might have been produced in the mains by condensation of the steam. The condense-water escapes into the trap and away by the discharge-opening C. The opening and closing of the valve goes on according as condense-water or steam fills the mains and comes into contact with the valve K. As hereinbefore stated, the spring P will force the valve K open should steam be turned off while the valve is closed.

It will of course be understood that I can modify the relation of parts of the trap without departing from the intent of my invention. Thus I may place the hooks E on the casing of the trap and the lugs F on the cover, and I may substitute for the helical spring P springs of other forms, and may make other obvious changes in the forms and relations of the parts.

I claim as my invention the following defined novel features and combinations, substantially as hereinbefore specified, namely:

1. In a steam-trap, a trap-casing having a steam-admission opening, whereby it is connected with a steam-pipe, in combination with cover for said trap, reciprocal lugs and hooks on said cover, and casing having interengaging inclined faces, and said cover being weighted on one side of its axis, whereby said weight holds said cover against axial movement on said casing and so prevents the displacement of the cover by the vibrations and jar to which the trap is subjected, substantially as set forth.

2. In a steam-trap, a casing having a steam-inlet and an annular inwardly-projecting metallic nipple O, projecting within said casing, surrounding said steam-inlet, and constituting an auxiliary valve-seat, in combination with a main valve-seat of elastic material surrounding said nipple and projecting within said casing to a greater distance than said auxiliary valve-seat, an annular retaining-ring M, surrounding said main valve-seat, the outer surface of which does not project so far within said casing as does the nipple O, and a thermo-expansible valve within said casing, which seats normally against said main valve-seat, but when said valve-seat is worn seats only against said auxiliary valve-seat, substantially as set forth.

In witness whereof I have hereunto signed my name in the presence of two subscribing witnesses.

EDWARD E. GOLD.

Witnesses:
ARTHUR FRASER,
JNO. E. GAVIN.